United States Patent
Wang et al.

(10) Patent No.: US 9,444,684 B2
(45) Date of Patent: Sep. 13, 2016

(54) METHOD AND SYSTEM FOR DETECTING NETWORK UPGRADES

(75) Inventors: Jia Wang, Randolph, NJ (US); Zihui Ge, Secaucus, NJ (US); Ajay Mahimkar, Woodbridge, NJ (US); Aman Shaikh, Berkeley Heights, NJ (US); Jennifer Yates, Morristown, NJ (US); Yin Zhang, Austin, TX (US); Joanne Emmons, Howell, NJ (US)

(73) Assignee: AT & T Intellectual Property I, L.P., Atlanta, GA (US)

( * ) Notice: Subject to any disclaimer, the term of this patent is extended or adjusted under 35 U.S.C. 154(b) by 1524 days.

(21) Appl. No.: 12/887,830

(22) Filed: Sep. 22, 2010

(65) Prior Publication Data
US 2012/0072556 A1    Mar. 22, 2012

(51) Int. Cl.
*G06F 15/177* (2006.01)
*H04L 12/24* (2006.01)

(52) U.S. Cl.
CPC ......... *H04L 41/0853* (2013.01); *H04L 41/142* (2013.01)

(58) Field of Classification Search
USPC ................................ 709/220, 223, 224, 227
See application file for complete search history.

(56) References Cited

U.S. PATENT DOCUMENTS

| | | | |
|---|---|---|---|
| 6,118,936 A * | 9/2000 | Lauer et al. ................... | 709/224 |
| 6,389,112 B1 * | 5/2002 | Stewart et al. ............ | 379/29.09 |
| 7,284,234 B2 * | 10/2007 | Steg et al. ..................... | 717/113 |
| 2005/0276385 A1* | 12/2005 | McCormick et al. ....... | 379/1.02 |

* cited by examiner

*Primary Examiner* — Brian J Gillis
(74) *Attorney, Agent, or Firm* — Fay Kaplun & Marcin, LLP

(57) ABSTRACT

A system and method identify a network upgrade from a data set including a plurality of configuration sessions. The system performs the method by receiving a plurality of configuration sessions. Each of the configuration sessions comprises a plurality of configuration commands. The configuration commands are generated by a same user identifier and within a time threshold. The method further includes identifying one of the configuration sessions as a network upgrade session. The identification is based on a rareness of the configuration session or a skewness of the configuration session.

20 Claims, 2 Drawing Sheets

METHOD AND SYSTEM FOR DETECTING NETWORK UPGRADES

BACKGROUND

Networks continue to develop to support new functions, improve reliability and performance, and decrease operating costs. In order to support such development, the hardware, software, and configuration of such networks may periodically be upgraded.

SUMMARY

The exemplary embodiments describe a method for identifying a network upgrade. The method includes receiving a plurality of configuration sessions, each of the configuration sessions comprising a plurality of configuration commands generated by a same user identifier and within a time threshold and identifying one of the configuration sessions as a network upgrade session, the identifying based on a rareness of the configuration session or a skewness of the configuration session.

The exemplary embodiments further describe a system for identifying network upgrades for network devices such as routers. The system includes a network recording device storing a data set including a plurality of configuration sessions for a plurality of network devices, each of the configuration sessions comprising a plurality of configuration commands generated by a same user identifier and within a time threshold. The system further includes an analysis device receiving the data set from the network recording device and identifying one of the configuration sessions as a network upgrade session, the identifying based on a rareness of the configuration session or a skewness of the configuration session.

The exemplary embodiments also describe a system comprising a non-transitory storage medium storing a set of instructions executable by a processor, to perform a method of identifying a network upgrade. The set of instructions are operable to receive a plurality of configuration sessions, each of the configuration sessions comprising a plurality of configuration commands generated by a same user identifier and within a time threshold and identify one of the configuration sessions as a network upgrade session, the identifying based on a rareness of the configuration session or a skewness of the configuration session.

DETAILED DESCRIPTION

Figure 1:
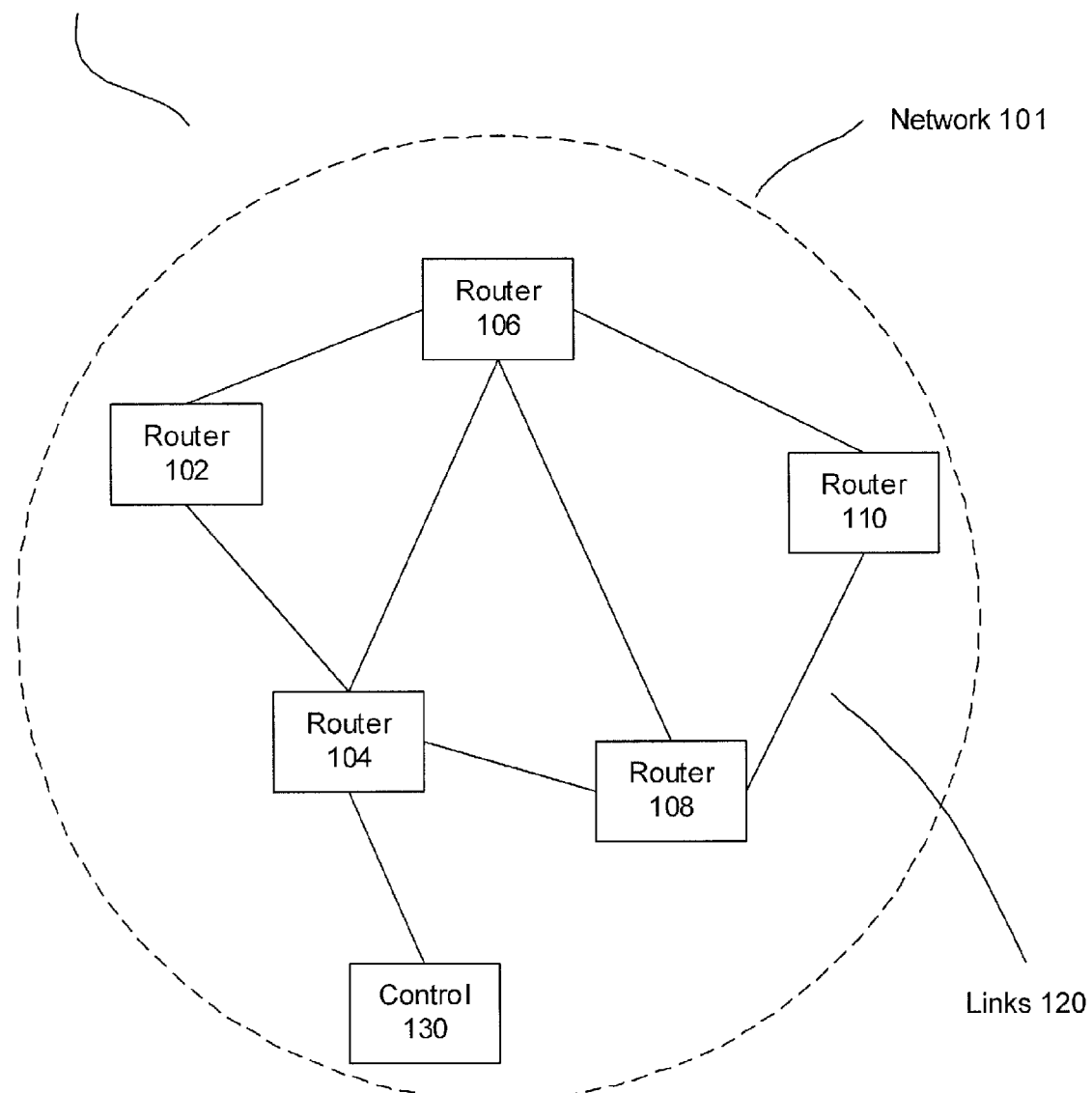
FIG. 1 shows an exemplary system.

The exemplary embodiments may be further understood with reference to the following description and the appended drawings, wherein like elements are referred to with the same reference numerals. The exemplary embodiments describe methods and systems for detecting network upgrades that may impact overall network performance.

Network providers may continually upgrade networks in order to support new functions and applications, improve performance and reliability, and decrease operational costs. These upgrades may be planned upgrades or they may be reactive upgrades that are the result of external network conditions, for example, Denial of Service (DoS) attacks or worm propagations. Possible upgrades may include the implementation of hardware, firmware or software, the introduction of new network or service features, and changes to network and/or device configuration. Typically, the changes are made one network element at a time (e.g., at a single router) and then applied across multiple network elements. While changes such as, for example, the introduction of new software governing the operation of a router may be tested in a controlled environment prior to implementation, such testing may not necessarily be able to accurately predict all possible results of implementation into a larger operational network environment. Thus, when such upgrades occur, it is important for overall network performance to be monitored in order to detect any unintended changes or results.

However, in large-scale networks, monitoring may occur at a large number of points, and performance changes may occur due to a large number of changes in network configuration being implemented by network maintenance personnel or automated network updating. Therefore, it is important to be able to identify network configuration activity, and distinguish upgrade activity from routine maintenance. To this end, the exemplary embodiments may monitor commands send by network maintenance personnel as well as status at various routers within a network, identify commands that relate to changes in router configuration, and extract, from those commands, configuration sessions possessing attributes characteristic of network upgrade activities.

FIG. 1 illustrates an exemplary system 100. The system includes a plurality of routers 102, 104, 106, 108 and 110 that are connected to one another in a network 101. The network 101 includes a plurality of links 120 joining the routers to one another, but because the number and arrangement of these links 120 is extraneous to the scope of the exemplary embodiments, they are not identified individually in this disclosure. The network 101 may be a computing network, a communications network, etc. Those of skill in the art will understand that the number and arrangement of the routers is only exemplary and that an unlimited number of variations may be possible in other embodiments. The system 100 may also include a control point 130, at which a user may issue commands to the routers 102-110, performance measurements for the routers 102-110 may be received, etc. Those of skill in the art will understand that each of the routers 102-110 may include memory storing firmware and software, a processor executing the firmware and software, one or more network interfaces, etc; for clarity, these elements are not shown in FIG. 1. Those skilled in the art should also understand that an actual network may have many more types of components in addition to routers (e.g., network servers, network appliances, memory devices, etc.). However, for the purposes of describing the exemplary embodiments, the network 101 is simplified to include only the routers 102-110 and the control point 130.

Figure 2:
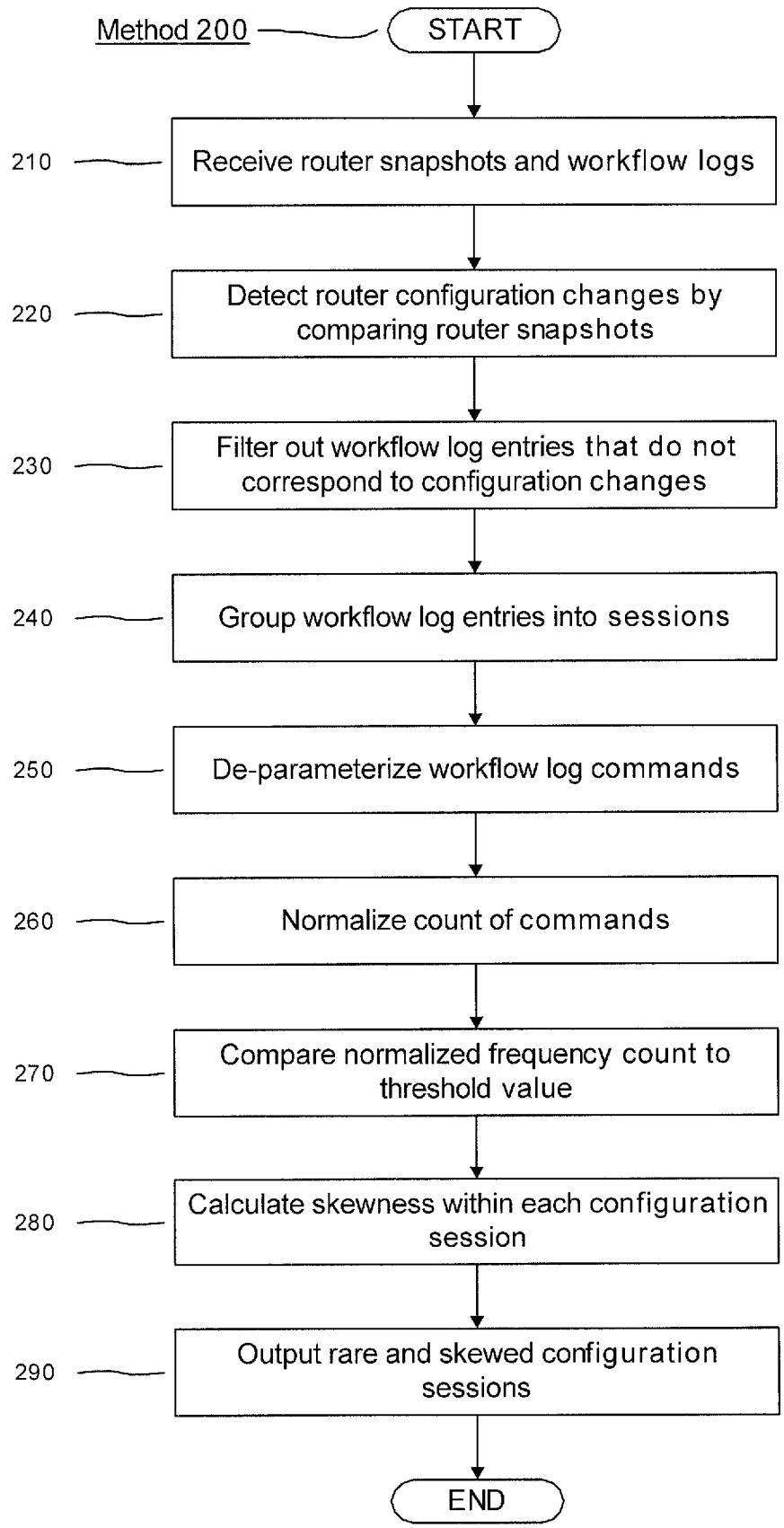
FIG. 2 shows an exemplary method for identifying network upgrade activities in a system such as the exemplary system of FIG. 1.

FIG. 2 illustrates an exemplary method 200 for identifying significant network upgrades that may potentially have an impact on overall network performance from among a broader set of network configuration changes that may also include routine maintenance, replacement of failed components, provisioning of new customers, etc. The exemplary method 200 may accomplish such identification based on measures of rareness and skewness of such activities.

In step 210, input data is received. This may include router configuration and router diagnostic information "snapshots" from each of the routers in the system 100 for a period of time to be analyzed. This may be a predetermined interval of time (e.g., six months, one year, etc.), may be user-configurable, or may include all historical snapshots for each of the routers. A router configuration snapshot may include router OS version and various other configuration information such as routing protocols, class of service, quality of service, etc. at the time of the snapshot. A diagnostic information snapshot may include firmware versions of each line card, hardware type, memory size, module status, etc. at the time of the snapshot. Typically, both types of snapshots may be taken from all routers within a network on a daily basis. Input data may also include workflow logs from a router control interface, such as at the control point 130. These logs may comprise commands issued to routers, and may include the commands themselves, associated authentication procedures, network operators' usernames and terminal information, timestamps, etc.

Those skilled in the art will understand that the above data collection is exemplary for the routers 102-110 of system 100. There may be other types of data that may be collected from the routers 102-110 and used in a manner consistent with the examples described below. In addition, other types of data may be collected from different types of network equipment such as switches, servers, network devices, etc. Again, this data collected from other network equipment may also be used in a manner consistent with the examples described below.

In step 220, for each router, sequential snapshots are compared to one another to determine if and when router operating systems and firmware have been changed. Because router snapshots may be created on a daily basis, configuration change information for routers may be obtained with a time precision of one day. However, those skilled in the art will recognize that other granularities of router snapshots may be used that are greater or less than one day.

Thus, at this step in the process, configuration changes at the routers 102-110 have been identified. As described above, in a large network there may be many configuration changes on a daily basis and only some of these configuration changes are related to actual network upgrades. For example, individual customer provisioning is a continual and frequent activity that may account for a substantial number of configuration changes. The configuration changes related to customer provisioning are unrelated to a network upgrade and are therefore irrelevant to the analysis for the exemplary embodiments. Therefore, the exemplary embodiments present a method of filtering these and other types of unrelated configuration changes to result in only those configuration changes that are designed to impact how the network 101 operates.

Accordingly, in step 230, workflow logs are collected from the routers 102-110 and/or a system that monitors access to control sessions for the routers 102-110. The workflow logs include an entry for each command issued to the routers 102-110 and may also include a timestamp, the network operator that issued the command and the terminal from which the command was issued. In step 230, these workflow log entries are used to filter out the router configuration changes that are not related to upgrades. This may be accomplished by comparing the workflow log entries to the configuration changes determined in step 220. If a workflow line or its negation (e.g., in some operating systems, preceding a configuration with "no" removes the effect of an existing configuration) does not appear in one of the router snapshots, then it may be assumed not to have lasting impact on the router, and can be safely filtered from consideration.

When step 230 is completed, some of the configuration changes that are not network upgrades have been filtered, but some configurations changes that are not upgrades (e.g., provisioning changes) may still be in the set of configuration changes. Thus, further filtering needs to be performed to identify those configuration changes that are related to network upgrades.

In step 240, the remaining workflow log entries are grouped into configuration sessions. This is necessary because the intention of a configuration change can typically be inferred only through examining a series of configuration commands, whereas the workflow logs themselves have a flat structure with each command being a separate entry. Thus, it may be necessary to group log entries into configuration sessions, which group individual commands into a higher level semantic. Typically, network operations personnel and automatic configuration management tools may perform one task at a time, and leave a sufficient gap in between tasks in order to allow proper verification of the effect of the changes that have been made. Based on this, each group of workflow log entries to be grouped into one configuration session is defined as the group of entries that are from the same user ID and within a time threshold of 10 minutes (e.g., each command is within 10 minutes of the immediate prior command). Based on experience with individual network operations, other time thresholds may be set.

Once this has been accomplished, it may be necessary to separate out significant network configuration changes or upgrades from lower-level tasks such as maintenance or provisioning of new customers. It may be desirable to perform this task automatically and with minimum dependency on domain expert input, which may be unreliable and easily outdated by new router operating system versions or features. Thus, the exemplary method 200 looks for configuration sessions that are "out of the ordinary" in some manner, as will be described below.

In steps 250, 260 and 270, the exemplary method 200 identifies configuration sessions that are of a type that occurs rarely. It may be apparent to those of skill in the art that if a configuration command is used rarely over a long period of time (e.g., on the order of several months), it is unlikely to be individual customer provisioning activities (which are more frequent), and highly likely to relate to a network upgrade (e.g., activating a new network feature). Two challenges exist in order to use this concept to select configuration sessions of sufficient rarity that they may be identified as network upgrade sessions under the scope of the exemplary embodiments; these two challenges will be addressed by steps 250 and 260.

The first challenge is that configuration sessions of the same type may appear differently in workflow logs due to the use of different parameters; for example, the command to set up BGP sessions at two different routers would include different peer IP addresses, and would thus appear as different command lines in workflow logs. In order to address this challenge, in step 250 the entries in the workflow logs are de-parameterized by removing all IP addresses, device names, network masks, and all other numbers indicative of the specific target of the command.

The second challenge is that not all configuration commands are supported across different router types or versions; thus, a command may be misinterpreted as rare merely because most routers in the network do not recognize the command, such as because it is directed to an uncommon type of router. To remedy this issue, in step 260 the frequency of all commands are normalized by the number of routers on which the command has ever appeared during the time window (e.g., a command that has appeared eighteen times during the time window being considered, with all eighteen occurrences involving three routers, has occurred six times per router during the time window.) Next, in step 270, a configuration command may be deemed to be rare if its frequency count is less than a predetermined rarity threshold (e.g., four occurrences of the same command per router in a six-month time window). All configuration sessions that include a rare command are deemed to be rare configuration sessions.

In step 280, the configuration sessions that have been identified as rare may be further filtered by testing them for skewness, which is a common structural difference between provisioning configurations and upgrade-related configurations. Individual customer provisioning may typically not repeat configuration lines, whereas upgrades may involve applying certain configuration sessions a significant number of times to different line cards, different customers, different protocol sessions, etc. In one example, the implementation of a new value for a carrier-delay trigger timer over a network may involve configuration changes to many network interfaces on each router. Thus, the corresponding configuration session may be "skewed" in terms of the frequency count of the different commands in the session. In order to evaluate skewness, each configuration session is evaluated separately. For each configuration session, a frequency count $c_i$ is computed for each different configuration command in the session. A mean value $\mu$ and a standard deviation $\sigma$ are determined for all the frequency counts $c_i$ within a configuration session. If any of the frequency counts $c_i$ are greater $\mu+6\sigma$, then the session is identified as a skewed configuration session. Finally, in step 290, configuration sessions that have been deemed to be either rare or skewed are output as network upgrade configuration sessions.

Those skilled in the art will understand that the above-described exemplary embodiments may be implemented in any number of manners, including, as a separate software module, as a combination of hardware and software, etc. For example, the method 200 may be a program containing lines of code that, when compiled, may be executed by a processor.

Those skilled in the art will understand that the above-described exemplary embodiments may be implemented in any number of manners, including, as a separate software module, as a combination of hardware and software, etc. For example, the method 200 may be a program containing lines of code that are stored on a non-transitory computer readable storage medium that, when compiled, may be executed by a processor. The computing device, which may be referred to as an analysis device, that includes such lines of code may be connected to the network 101, for example, the control point 130 may include the functionality described above or it may be a separate device that receives the data from the network 101 and performs the functionality described herein.

It will be apparent to those skilled in the art that various modifications may be made to the exemplary embodiments, without departing from their spirit or scope. Thus, it is intended that this disclosure cover modifications and variations of the exemplary embodiments provided they come within the scope of the appended claims and their equivalents.

What is claimed is:

1. A method, comprising:
receiving a plurality of configuration sessions, each of the configuration sessions comprising a plurality of configuration commands generated by a same user identifier and within a time threshold; and
identifying one of the configuration sessions as a network upgrade session, the identifying based on one of A) a rareness of the configuration session, and B) a skewness of the configuration session.

2. The method of claim 1, wherein receiving the plurality of configuration sessions comprises:
receiving a plurality of configuration snapshots, each of the snapshots comprising information describing a configuration of a router at a corresponding time and date;
receiving a plurality of configuration commands, each of the commands having been sent to a router at a specified time and date;
generating a filtered plurality of configuration commands, wherein the filtered plurality of configuration commands is generated by removing, from the plurality of configuration commands, all configuration commands that do not correspond to a change between a first one of the configuration snapshots and a second one of the configuration snapshots; and
generating, from the filtered plurality of configuration commands, a plurality of configuration sessions, wherein each of the configuration sessions comprises one of the configuration commands generated by a same user identifier and within a time threshold.

3. The method of claim 1, further comprising:
generating a plurality of de-parameterized configuration sessions by removing, from each of the configuration commands, one of an IP address, a device name, and a network mask;
dividing the configuration commands into a plurality of types of commands;
determining, for each of the types of commands, a number of routers that received a command of the type during a time period;
determining, for each of the types of commands, a number of instances of the type of command during the time period;
determining, for each of the types of commands, a normalized frequency count based on the number of routers and the number of instances;
identifying a type of commands as a rare type of commands if the normalized frequency count of the type is less than a threshold value; and
identifying one of the configuration sessions as a rare configuration session if it includes a command of a rare type of commands.

4. The method of claim 1, further comprising:
determining a count of each of a plurality of types of configuration commands within each of the configuration sessions; and
identifying one of the configuration sessions as a skewed configuration session if one of the counts is greater than a threshold count.

5. The method of claim 4, further comprising:
determining, for each of the configuration sessions, a mean of the counts and a standard deviation of the counts,
wherein the threshold count is determined based on the mean and the standard deviation.

6. The method of claim 5, wherein the threshold count is the mean of the counts plus six times the standard deviation of the counts.

7. The method of claim 1, wherein a configuration session is identified as a network upgrade session if it is a rare configuration session and a skewed configuration session.

8. The method of claim 1, wherein the configuration commands are sent to a router in a network.

9. The method of claim 8, wherein the network is the Internet.

10. A non-transitory computer readable storage medium storing a set of instructions executable by a processor, the set of instructions, when executed by the processor, causing the processor to perform operations comprising:
receiving a plurality of configuration sessions, each of the configuration sessions comprising a plurality of configuration commands generated by a same user identifier and within a time threshold; and
identifying one of the configuration sessions as a network upgrade session, the identifying based on one of A) a rareness of the configuration session, and B) a skewness of the configuration session.

11. The computer readable storage medium of claim 10, wherein the operation of receiving the plurality of configuration sessions comprises sub-instructions comprising:
receiving a plurality of configuration snapshots, each of the snapshots comprising information describing a configuration of a router at a corresponding time and date;
receiving a plurality of configuration commands, each of the commands having been sent to a router at a specified time and date;
generating a filtered plurality of configuration commands, wherein the filtered plurality of configuration commands is generated by removing, from the plurality of configuration commands, all configuration commands that do not correspond to a change between a first one of the configuration snapshots and a second one of the configuration snapshots; and
generating, from the filtered plurality of configuration commands, a plurality of configuration sessions, wherein each of the configuration sessions comprises one of the configuration commands generated by a same user identifier and within a time threshold.

12. The computer readable storage medium of claim 10, wherein the operations further comprise:
generating a plurality of de-parameterized configuration sessions by removing, from each of the configuration commands, one of an IP address, a device name, and a network mask;
dividing the configuration commands into a plurality of types of commands;
determining, for each of the types of commands, a number of routers that received a command of the type during a time period;
determining, for each of the types of commands, a number of instances of the type of command during the time period;
determining, for each of the types of commands, a normalized frequency count based on the number of routers and the number of instances;
identifying a type of commands as a rare type of commands if the normalized frequency count of the type is less than a threshold value; and
identifying one of the configuration sessions as a rare configuration session if it includes a command of a rare type of commands.

13. The computer readable storage medium of claim 10, wherein the operations further comprise:
determining a count of each of a plurality of types of configuration commands within each of the configuration sessions; and
identifying one of the configuration sessions as a skewed configuration session if one of the counts is greater than a threshold count.

14. The computer readable storage medium of claim 13, wherein the operations further comprise:
determining, for each of the configuration sessions, a mean of the counts and a standard deviation of the counts,
wherein the threshold count is determined based on the mean and the standard deviation.

15. The computer readable storage medium of claim 14, wherein the threshold count is the mean of the counts plus six times the standard deviation of the counts.

16. The computer readable storage medium of claim 10, wherein a configuration session is identified as a network upgrade session if it is a rare configuration session and a skewed configuration session.

17. The computer readable storage medium of claim 10, wherein the configuration commands are sent to a router in a network.

18. The computer readable storage medium of claim 17, wherein the network is the Internet.

19. A system, comprising:
a network recording device storing a data set including a plurality of configuration sessions for a plurality of network devices, each of the configuration sessions comprising a plurality of configuration commands generated by a same user identifier and within a time threshold; and
an analysis device receiving the data set from the network recording device and identifying one of the configuration sessions as a network upgrade session, the identifying based on one of A) a rareness of the configuration session, and B) a skewness of the configuration session.

20. The system of claim 19, wherein the analysis device identifies a configuration session as a network upgrade session if the configuration session is a rare configuration session and a skewed configuration session.

* * * * *